(12) United States Patent
George et al.

(10) Patent No.: US 7,104,588 B2
(45) Date of Patent: Sep. 12, 2006

(54) MECHANISM FOR MOVING A DOOR

(75) Inventors: Michael George, Bridgeport, CT (US); Kyle Brookes, Troy, NY (US); Stephen Derby, Troy, NY (US)

(73) Assignee: Toto Tech, INC, Bridgeport, CT (US)

( * ) Notice: Subject to any disclaimer, the term of this patent is extended or adjusted under 35 U.S.C. 154(b) by 52 days.

(21) Appl. No.: 11/057,780

(22) Filed: Feb. 14, 2005

(65) Prior Publication Data

US 2005/0140145 A1 Jun. 30, 2005

Related U.S. Application Data

(63) Continuation of application No. 10/456,254, filed on Jun. 6, 2003, now Pat. No. 6,860,543, and a continuation-in-part of application No. 10/427,257, filed on May 1, 2003, now Pat. No. 6,851,743.

(60) Provisional application No. 60/376,952, filed on May 1, 2002.

(51) Int. Cl.
*B60J 5/00* (2006.01)
(52) U.S. Cl. .................. 296/146.12; 49/248
(58) Field of Classification Search .......... 296/146.11, 296/146.12; 49/246, 248
See application file for complete search history.

(56) References Cited

U.S. PATENT DOCUMENTS

| | | | |
|---|---|---|---|
| 1,639,037 A | 8/1927 | Hollingshead | |
| 1,869,274 A | 7/1932 | Phillips | |
| 2,542,605 A | 2/1951 | Werner | |
| 2,991,117 A | 7/1961 | Tatter | |
| 3,758,990 A | 9/1973 | Balanos | |
| 4,135,760 A | 1/1979 | Grossbach | |
| 4,544,198 A | 10/1985 | Ochiai et al. | |
| 4,561,690 A | 12/1985 | Shinjo et al. | |
| 4,932,714 A | 6/1990 | Chance | |
| 5,398,988 A | 3/1995 | DeRees et al. | |
| 5,735,080 A | 4/1998 | Pratolongo | |
| 5,775,028 A * | 7/1998 | Lambert | 49/248 |
| 6,059,352 A | 5/2000 | Heldt et al. | |
| 6,196,618 B1 | 3/2001 | Pietryga et al. | |
| 6,213,535 B1 | 4/2001 | Landmesser et al. | |
| 6,328,374 B1 | 12/2001 | Patel | |
| 6,382,705 B1 | 5/2002 | Lang et al. | |
| 6,385,910 B1 | 5/2002 | Smink et al. | |
| 6,447,054 B1 | 9/2002 | Pietryga et al. | |
| 6,616,214 B1 | 9/2003 | Wattebled | |

FOREIGN PATENT DOCUMENTS

CH 295874 1/1954

* cited by examiner

*Primary Examiner*—Dennis H. Pedder
(74) *Attorney, Agent, or Firm*—Butzel Long (57) ABSTRACT

A mechanism for moving a door relative to an access opening in a door frame includes three links pivotally connected between the door and the door frame permitting outward and lateral movement of the door. A structural member or pillar releasably secured to the door frame can move with the door and the mechanism can include a supporting member extending beneath and supporting the door during movement.

18 Claims, 10 Drawing Sheets

MECHANISM FOR MOVING A DOOR

CROSS-REFERENCE TO RELATED APPLICATION

This application is a continuation of U.S. patent application 10/456,254, filed Jun. 6, 2003, now U.S. Pat. No. 6,860,543 and a continuation-in-part of the U.S. patent application Ser. No. 10/427,257 filed May 1, 2003, now U.S. Pat. No. 6,851,743, which claims the benefit of U.S. provisional patent application Ser. No. 60/376,952 filed May 1, 2002.

BACKGROUND OF THE INVENTION

The present invention relates generally to doors and mechanisms for moving doors relative to a door frame defining an access opening.

Most doors are mounted in door frames by two or more hinges along one side edge for swinging (pivotal) movement about a vertical axis between closed and open positions relative to an access opening in the door frame. For doors associated with buildings, the swing arc is only limited by the wall surface surrounding or adjacent to the door frame such that the door usually can be opened so as to expose the entire access opening. However, vehicle door assemblies typically have a swing arc that is limited to less than 90° such that the door access opening is not completely exposed when the door is "fully" open. This limited space makes it difficult for a person having less than complete mobility to ingress and egress the vehicle.

Instead of swinging movement, sometimes it is desirable to mount a door on tracks for sliding movement generally parallel to a plane of the door access opening. For example, many vehicles such as panel trucks and vans have at least one side door mounted for sliding movement along an outer side surface of the vehicle. Such a door is typically slidably connected to an upper track located at an upper edge of the door frame access opening near the vehicle roof, a lower track located at a lower edge of the door frame access opening near the sill area, and a center track located in the vehicle side wall near a rear edge of the door frame access opening. This sliding mechanism permits movement of the door a short distance outwardly from the door access opening and then generally parallel to the plane of the door access opening. Although such a configuration can be used with vehicles having generally planar sides such as panel trucks, conversion vans and mini vans, it is not well suited for passenger cars, station wagons and car-based SUV's.

SUMMARY OF THE INVENTION

The present invention relates to a mechanism for moving a door so as to expose an access opening to a greater extent will than a typical hinged swinging door. When used in a door system for a vehicle having a door frame defining a front access opening and an adjacent rear access opening, the door system includes: a center pillar attached to the door frame between the front access opening and the rear access opening; a door assembly covering the rear access opening and having a top edge, a bottom edge and a pair of opposed side edges extending between the top edge and the bottom edge; and a mechanism for moving the door relative to the door frame. The mechanism includes: a first link having one end pivotally attached at the door assembly top edge adjacent a first one of the door assembly side edges and having an opposite end pivotally attached to the door frame adjacent the door assembly top edge; a second link having one end pivotally attached at the door assembly bottom edge adjacent the first one of the door assembly side edges and having an opposite end pivotally attached to the door frame adjacent the door assembly bottom edge; and a third link having one end pivotally attached at the door assembly bottom edge and having an opposite end pivotally attached to the door frame whereby the first, second and third links define a path of movement of the door assembly relative to the door frame between a closed position covering the rear access opening and an open position exposing the rear access opening, the path of movement being outwardly from the door frame and past a side edge of the rear access opening. Thus, operation of the mechanism creates a single large access opening from the front and rear access openings unobstructed by the center pillar and the rear door.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
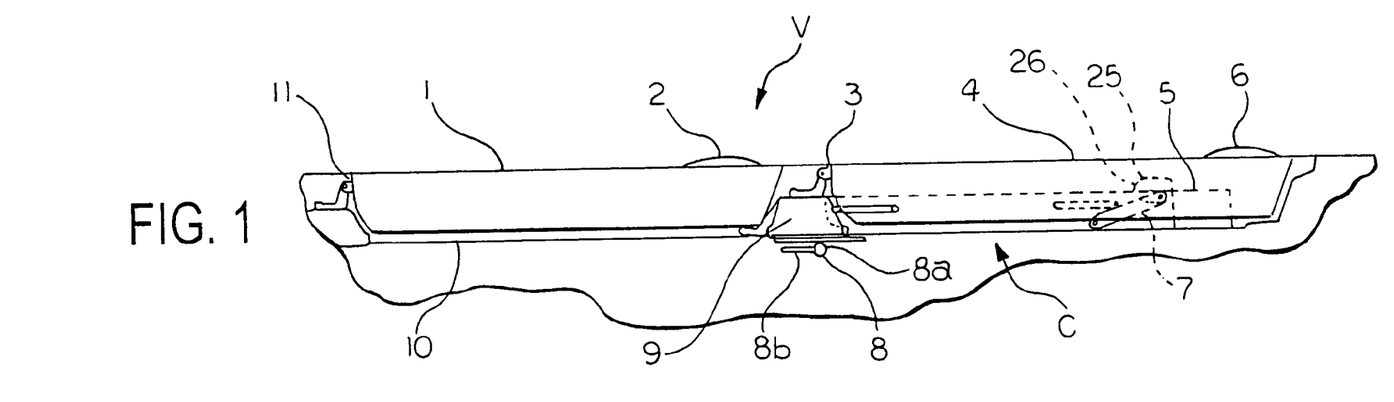
FIG. 1 is a fragmentary top plan view showing a slide door and structural assembly with a slide mechanism in accordance with the present invention installed in a four-door vehicle.
Figure 2:
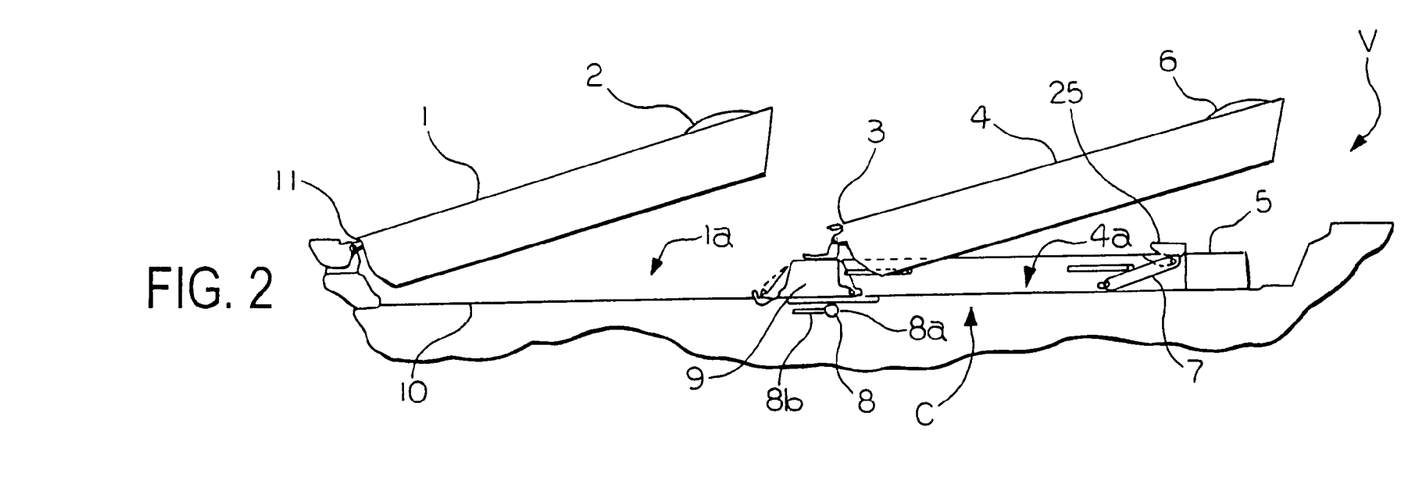
FIG. 2 is a view similar to FIG. 1 wherein a swing door and the slide door are pivotally opened in a standard mode.
Figure 3:
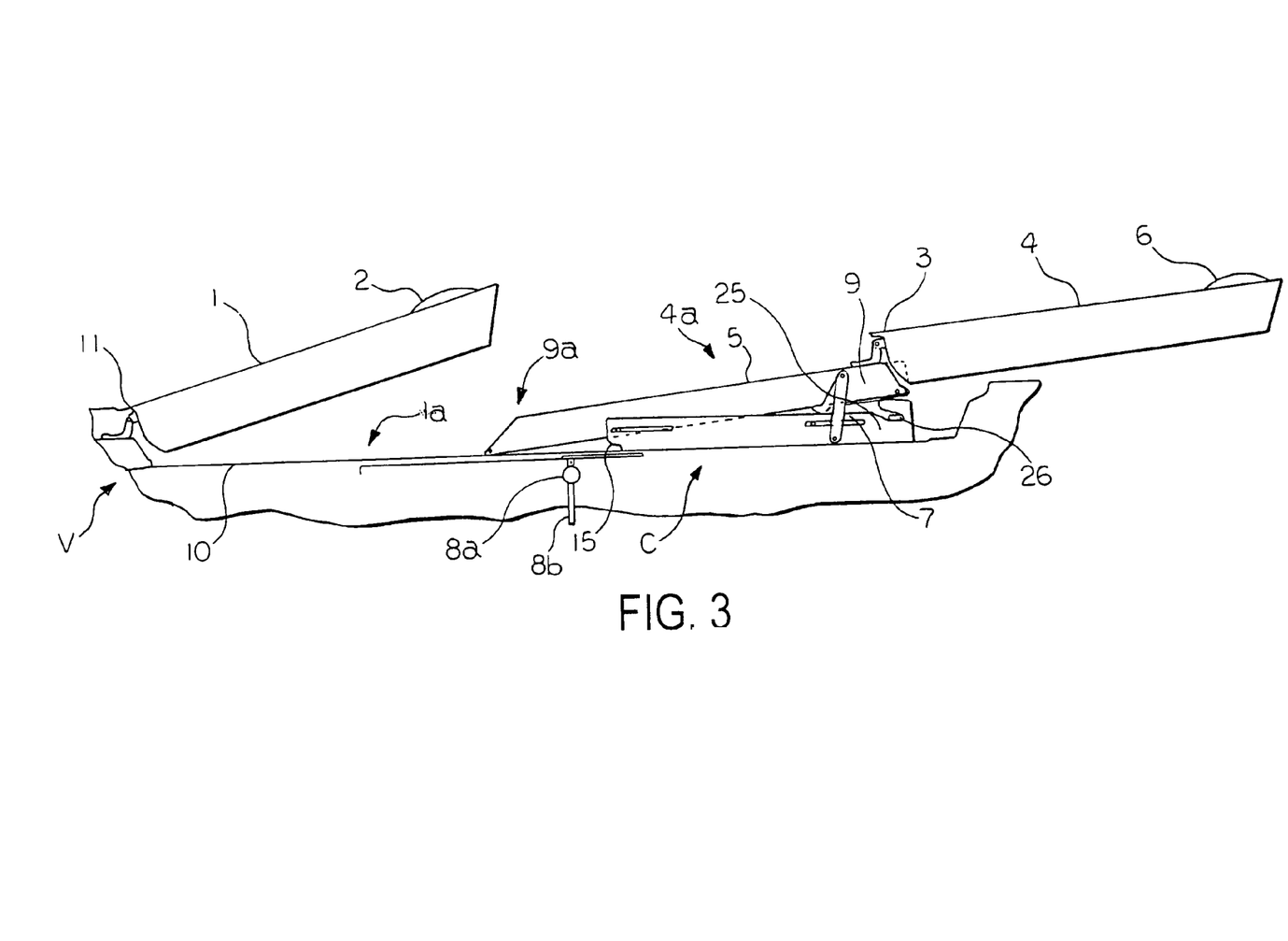
FIG. 3 is a view similar to FIG. 1 wherein the slide door and the associated structural member are moved in the direction of the rear of the vehicle in order to increase the size of the standard access opening formed in the vehicle.

The FIGS. 1–7 illustrate one embodiment of the present invention that shall be used for illustrative purposes, and is not intended in any way to limit the scope of the invention. FIG. 1 is a fragmentary top plan view of a portion of one side of a four-door vehicle V, such as an automobile having a door frame 10. The term door frame is used herein to describe that portion of a vehicle unibody surrounding a door opening generally formed in a side or rear surface of the vehicle. For vehicles having a separate body attached to a supporting frame, the door frame can include portions of the body and the frame. Installed within the door frame 10 are a standard swing door 1 for access to a front seat portion of the automobile and a slide door 4 for access to a rear seat portion of the automobile. In FIG. 1, the doors 1 and 4 are closed and in FIG. 2, the doors are partially open. As shown in FIG. 2, the swing door 1 includes a conventional swing handle 2. By pulling upwardly (or outwardly depending upon the construction) on the swing handle 2, the swing door 1 is unlatched at a rear edge thereof and can be opened in a standard fashion by rotating the door about a side hinge 11 attached between a front edge of the door and the door frame 10, as best seen in FIGS. 2 and 3. Similarly, the slide door 4 includes a swing handle 6. Again, by pulling upwardly, or outwardly, on the swing handle 6, the slide door 4 can be unlatched and opened in a standard fashion by rotating the slide door 4 about a center hinge 3 attached between a front edge of the door and the door frame 10. It will be appreciated that the swing handles 2 and 6 can be any type of known vehicle door handle.

FIG. 2 shows both of the doors 1 and 4 in a standard partially swung open position. It will be appreciated that the doors 1 and 4 can be opened and closed independently of one another between the closed positions shown in FIG. 1 and fully opened positions (not shown) which is a first or standard mode of operation of the doors. When either of the doors 1 and 4 is opened, an associated access opening defined by the door frame 10 is exposed which openings are approximately the sizes of the respective doors. Front and rear access openings 1a and 4a, associated with the doors 1 and 4 respectively, are separated by a structural member such as a center pillar 9, which in the disclosed embodiment is preferably the B-pillar in an automobile system. The pillar 9 extends vertically between a rear edge of the door 1 and a front edge of the door 4 and is part of the door frame 10 defining an edge of each of the openings 1a and 4a. The pillar 9 is releasably attached at upper and lower ends to the remainder of the door frame 10. As shown in FIG. 3, a slide mechanism C according to the present invention permits both the pillar 9 and the slide door 4 to be repositioned along the door frame 10 in a second mode of operation creating a larger side opening in the vehicle V including the access openings 1a and 4a and an area 9a normally occupied by the pillar 9.

Figure 4:
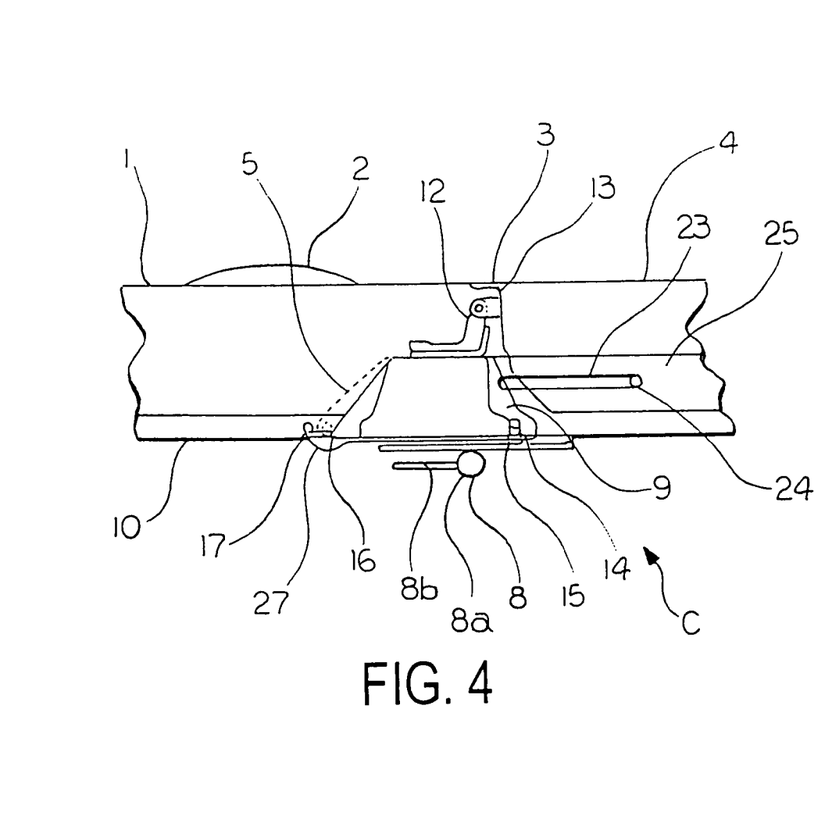
FIG. 4 is an enlarged view of a central portion of FIG. 1 showing the slide door, the structural member assembly and a forward part of the slide mechanism.
Figure 5:
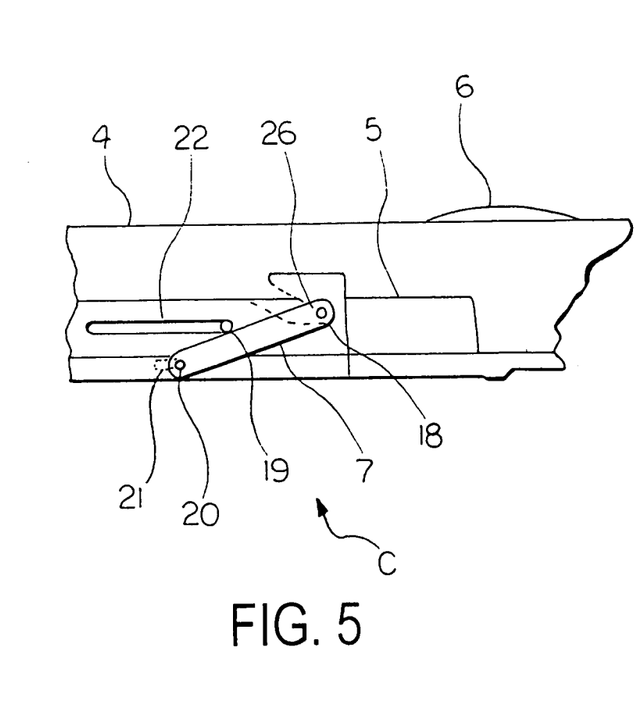
FIG. 5 is an enlarged view of a rearward portion of FIG. 1 showing a latching system that forms a rearward part of the slide mechanism.
Figure 6:
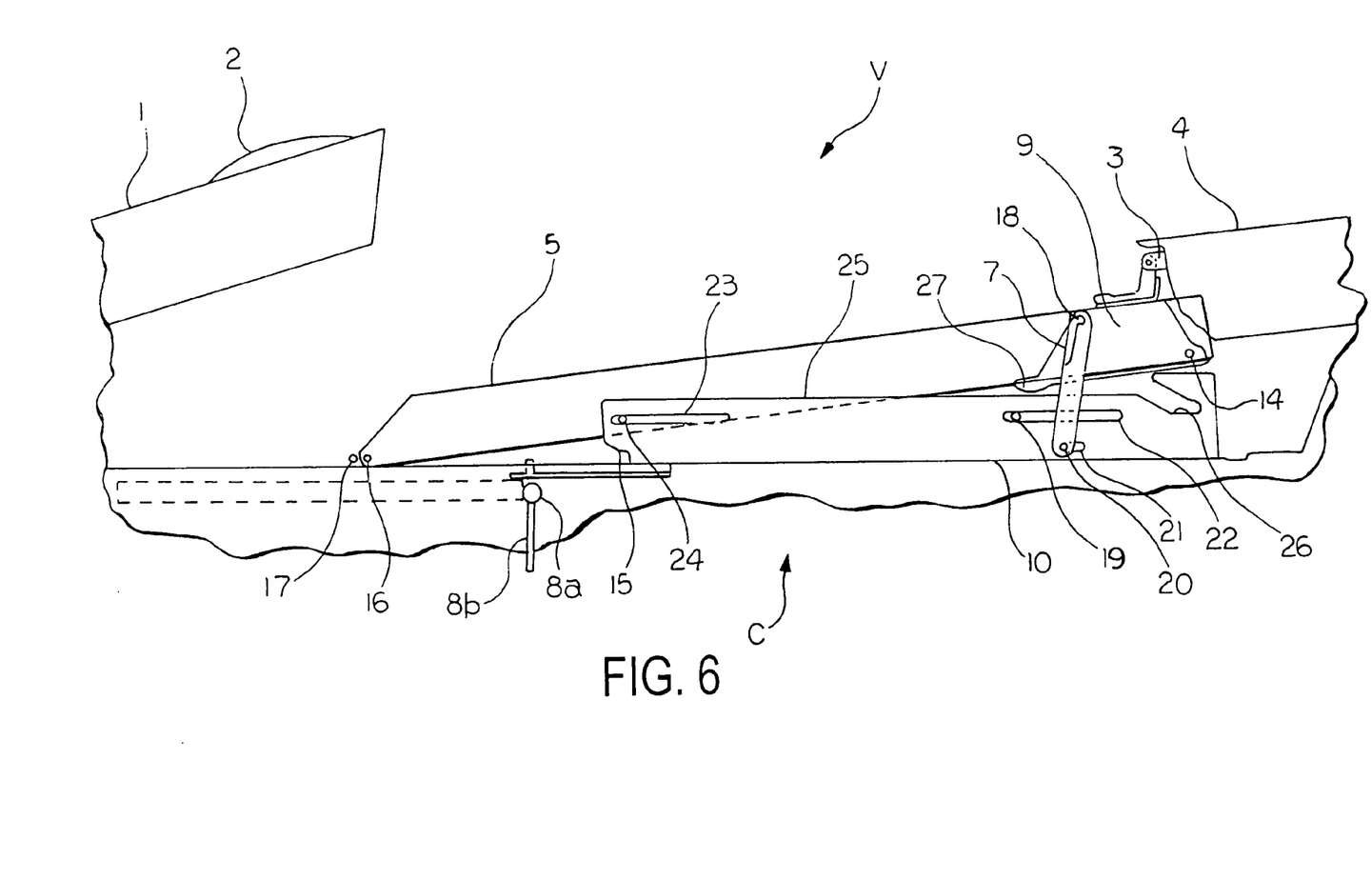
FIG. 6 is an enlarged view of a portion of FIG. 3 wherein the slide door and the structural member are moved to the fully extended position.

As shown in FIGS. 4 and 5, the slide mechanism C preferably includes a door carrier 5, a slide lever 8, a catch slide 25 and a pitch pole assembly 7. As best seen in FIG. 6, the door carrier 5 is coupled to the door frame 10 at the front end by a pivot door carrier 16 to pivot outwardly from the access opening 4a and provide a support surface along which the slide door 4 slides during the second mode of operation. Although not shown, the door carrier 5 may support a track or rail assembly of the type known and used in the industry. This arrangement permits the slide door 4 and pillar 9 to slide along the door carrier 5 to a final, fully open, extended position as shown in FIGS. 3 and 6. The sliding movement of the slide door 4 and pillar 9 is generally transverse, but at a slight angle, to a plane of the access opening 4a.

In FIG. 4, the slide lever 8 is shown as including a base 8a mounted on the door frame 10 and a handle 8b extending from the base. The slide lever 8 is coupled to the catch slide 25 by a conventional latching mechanism (not shown) for selectively holding the catch slide in a locked position (shown in FIGS. 1, 2, 4 and 5) and releasing the catch slide for movement to an unlocked position (FIGS. 3 and 6).

As shown in FIG. 6, the catch slide 25 includes an elongated body portion that extends along the door frame 10, and is also movably secured to the frame. At a front end of the elongated body portion, the catch slide 25 defines a notch 15, the center pillar catch, that abuts one end of the center pillar 9 to help secure and properly position the center pillar 9 within the door frame 10. Also, at a rear end of the catch slide 25 there is defined a hook-shaped notch 26, the catch pitch pole notch, that secures the pitch pole 7 as described in more detail below.

Within the body portion of the catch slide 25, there are formed elongated guide openings 22 and 23, as best seen in FIGS. 4 and 5, that extend along a longitudinal axis of the catch slide. Guide pins 19 and 24 are secured in and travel within the respective openings 22 and 23. A shorter guide opening 21 extends parallel and adjacent to the guide opening 22. A chuck pin 20 movably couples one end of the pitch pole 7 in the opening 21.

As best seen in FIG. 5, the pitch pole 7 is an elongated member having one end that is pivotally secured in the opening 21 by the chuck pin 20. An opposite end of the pitch pole 7 is pivotally coupled to the door carrier 5 by a pin connection 18. As best seen in FIG. 1, when the slide door 4 is closed, the opposite end of the pitch pole 7 with the pin 18 rests in the hook-shaped notch 26 defined by the catch slide 25.

Additionally, the slide mechanism C includes mechanisms that permit the center pillar 9 to be movably coupled to the catch slide 25. As best seen in FIG. 4, when the slide door 4 is in the closed position, a forward end 27 of the center pillar 9 abuts an auxiliary strike 17 positioned adjacent to the pivot door carrier 16, wherein the auxiliary strike 17 serves as a position locator for the center pillar 9.

Referring to FIG. 6, a rearward end 28 of the center pillar 9 supports a strike pin 14. When the center pillar 9 is in the normal position, i.e., acting as a load-bearing member, the strike pin 14 rests in the center pillar catch 15 defined in the catch slide 25.

As best seen in FIG. 4, the center pillar 9 is coupled to the slide door 4 via the center hinge 3. The center hinge 3 includes a center hinge mount 13 that is secured to the slide door 4 and a center hinge base 12 that is supported by the center pillar 9.

Cooperation among the slide lever 8, the catch slide 25 and the movable center pillar 9 allows the access openings 1a and 4a formed by the doors 1 and 4 respectively to be consolidated so as to create an access opening larger than that formed by either of the two access openings. The following description details the operation of the slide mechanism C.

OPERATION OF THE SLIDE MECHANISM

To open the slide door 4 and move the center pillar 9 in the second mode of operation, the swing door 1 must be fully open. Once the swing door 1 is fully open and the slide door 4 is unlatched, the slide lever 8 can be actuated. Actuation of the slide lever 8 causes the catch slide 25 to slide in the direction of the rear of the vehicle V. This action causes the catch center pillar notch 15 to slide away from the center pillar 9, thus, releasing the strike pin 14 of the center pillar 9. This action also causes the pitch pole 7 to rotate up and out of the pitch pole catch 26.

As the pitch pole 7 rotates up, the door carrier 5 rotates about the pivot door carrier 16. When the pitch pole 7 has been rotated to its outermost position, the door carrier 5 will also have been rotated to a sliding position, a position that aligns the door carrier 5 at an angle to the side of the vehicle V. In this position, the door carrier 5 establishes a suitable clearance between the slide door 4 and the vehicle body to permit the slide door 4 to move back and forth along the vehicle body without hitting the vehicle body. Preferably, the pivot door carrier 16 is configured to permit control over how far the slide door 4 rotates out from the vehicle body. For example, if the slide door 4 is allowed to rotate out too far, the slide door may inadvertently strike persons or objects near the exterior of the slide door. Likewise, too small a rotation about the pivot door carrier 16 may result in the slide door 4 striking the body of the vehicle in which it is installed, thus preventing or at least interfering with the slide capability of the slide door. Once the door carrier 5 is in the slide position, the center pillar 9 and the slide door 4 can be pushed toward the rear of the vehicle to a fully extended position, thus creating a larger access opening in the frame 10.

Figure 7:
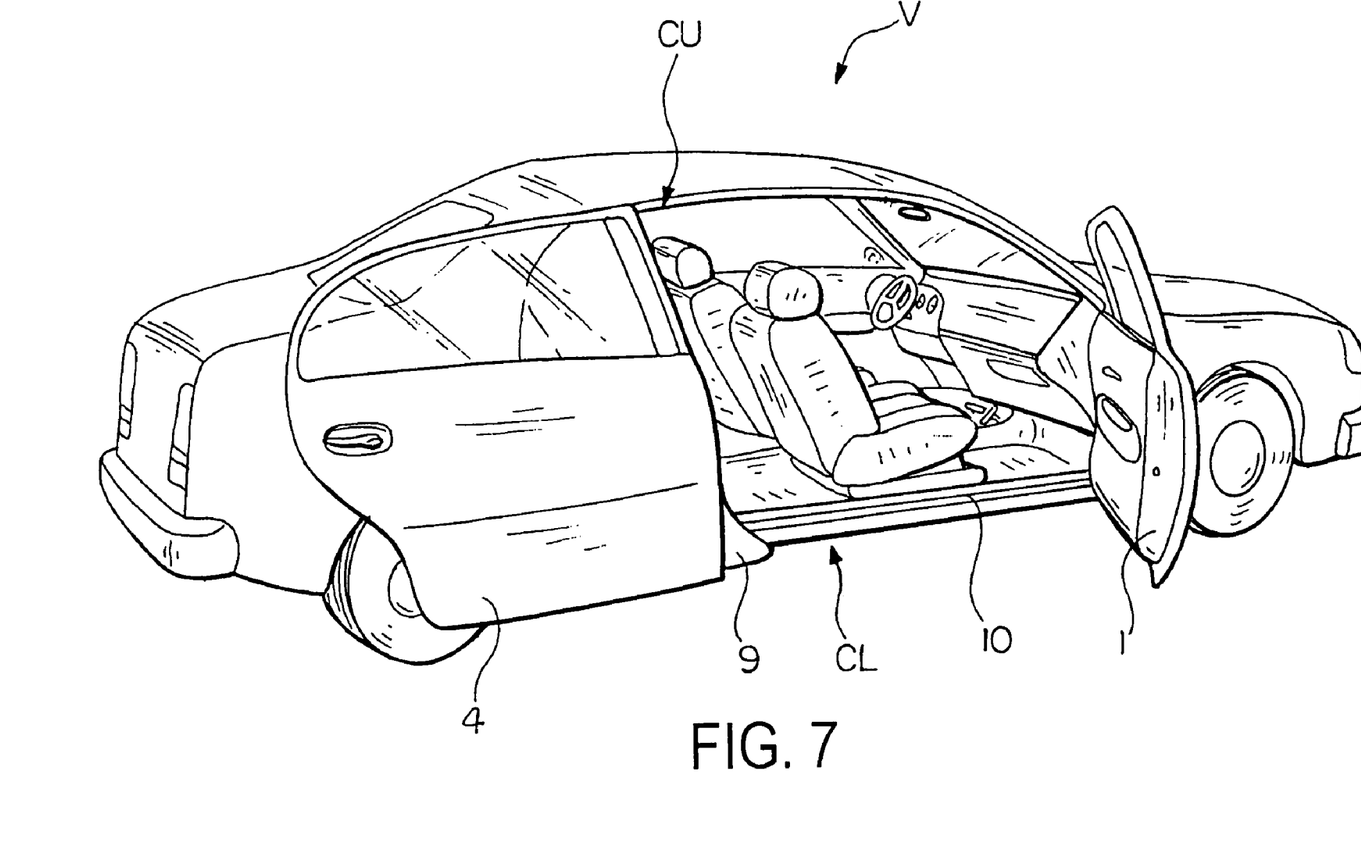
FIG. 7 is a side elevation view of the vehicle of FIG. 1 with the front swing door fully open and the rear slide door and the structural member in the fully extended position shown in FIG. 6.

There is shown in FIG. 7, the vehicle V having the swing door 1 fully open and the assembly of the slide door 4 with the center pillar 9 in the rearward position creating a maximum size access opening. The slide mechanism C described above is implemented as a lower slide mechanism CL attached at the bottom of the door frame 10 and a similar upper slide mechanism CU attached at the top of the door frame. While the slide mechanisms CL and CU have the same components as the slide mechanism C, the upper slide mechanism does not have to be as robust since it is not supporting the weight of the slide door 4 and the center pillar 9. As shown in FIG. 6, the door carrier 5 is coupled to the door frame 10 at the front end by a pivot door carrier 16. The pivot door carriers 16 of the slide mechanisms CL and CU provide two pivot points, one located at or near the roofline of the vehicle V and the other at or near the base of the door frame 10, about which the door carriers 5 rotate with the slide door 4 and the center pillar 9.

The slide mechanism C (CL, CU) has been described with reference to a four-door automobile with the door frame 10 having the center pillar 9. However, it will be appreciated that the slide mechanism C can be incorporated into any structure, including but not limited to, a building, an airplane, a boat, a ship or any other similar device. It will also be appreciated that the slide mechanism may be used in conjunction with a hatch type door as well as a pivot door of the type described herein.

Figure 8:
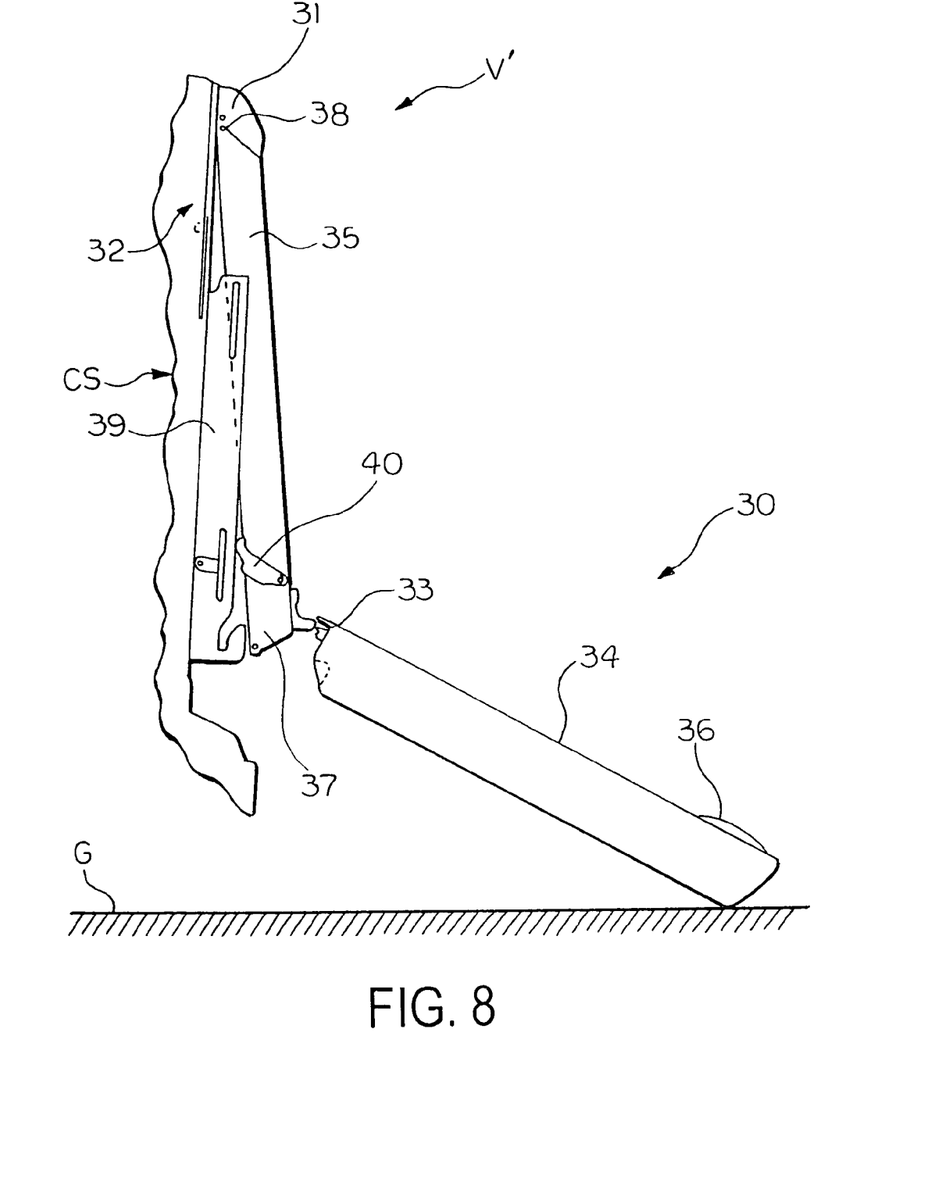
FIG. 8 is a fragmentary side elevation view of another embodiment of the present invention wherein the slide door also functions as a ramp.

For example, there is shown in FIG. 8 a vehicle V' having a slide door/ramp assembly 30 supported in a door frame 31 defining an access opening 32. The assembly 30 is attached to a side slide mechanism CS similar to the slide mechanism C, but installed in a vertical orientation. The slide mechanism CS is representative of two such mechanisms, one connected at either side of the assembly 30. A hinge 33 rotatably connects a hatch door 34 to a structural member such as a header 37 extending horizontally across the rear of the vehicle V'. The hatch door 34 has a handle 36 for operation of the door in the first mode wherein the header 37 is positioned at the top of the opening 32 and the door pivots outwardly and upwardly about the hinge 33.

A door carrier 35 is pivotally attached to the door frame 31 by a pivot door carrier 38 and cooperates with a catch slide 39 through a pitch pole 40. After the header 37 is released from attachment to the door frame 31, in a manner similar to the operation of the slide mechanism C described above, the door carrier 35 swings to the position shown in FIG. 8 and the assembly of the header with the hatch door 34 slides downwardly to a ground surface G. The sliding movement is generally transverse, but at an angle, to a plane of the access opening 32. The hatch door can be pivoted on the hinge 33 to assume the position shown wherein a lower end of the hatch door rests on the ground G and the hatch door can function as a ramp. If desired, a cover (not shown) can be placed on the upwardly facing outer surface of the hatch door 34 to protect the finish and/or any window installed therein.

Figure 9:
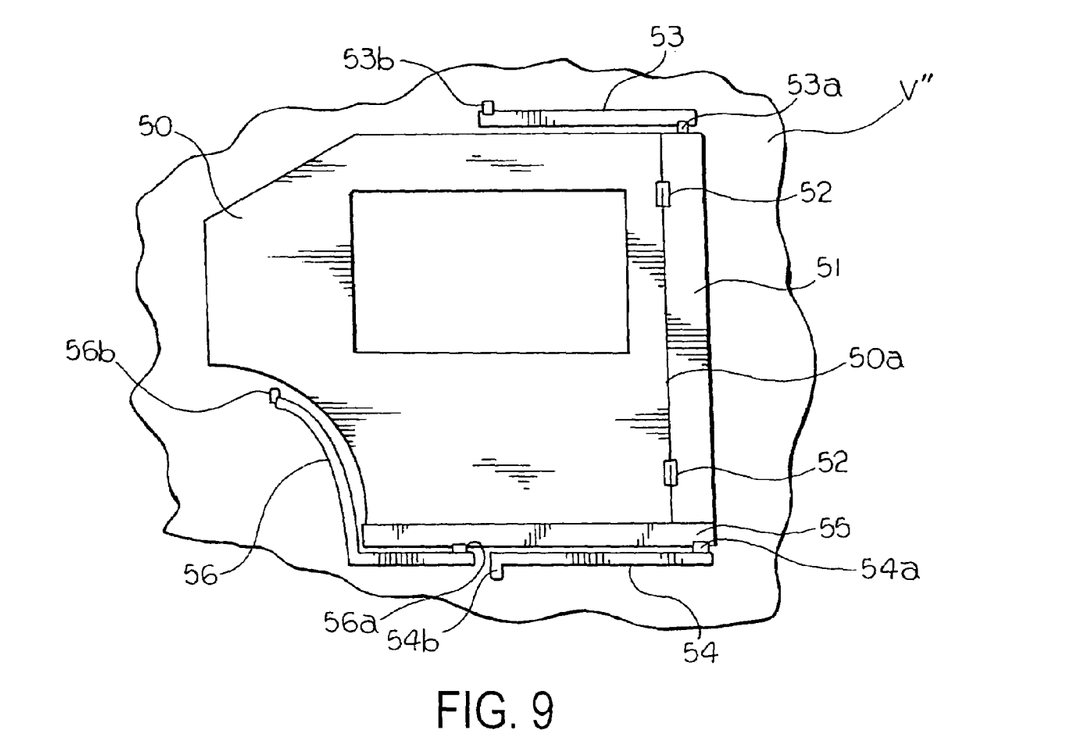
FIG. 9 is a schematic elevation view of a vehicle door and movement mechanism according to another embodiment of the present invention.

There is shown in FIG. 9a portion of a vehicle V" having rear side door 50 attached at a first or leading edge 50a to a center or "B" pillar of the vehicle by a pair of hinges 52. The door 50 is in a closed position covering a rear access opening (not shown). The hinges 52 permit the door 50 to be swung open about a generally vertical axis in the normal manner pivoting about the attachment points at the pillar 51.

An upper or first link 53 has one end 53a pivotally attached to an upper end of the pillar 51 and an opposite end 53b pivotally attached to the frame of the vehicle V". In a similar manner, a lower or second link 54 has one end 54a pivotally attached adjacent a lower end of the pillar 51 and an opposite end 54b pivotally attached to the frame of the vehicle V". A supporting member 55 extends beneath the door 50 and is attached to the lower end of the pillar 51. The member 55 has the end 54b of the lower link 54 pivotally attached thereto. A rear or third link 56 has one end pivotally attached to the supporting member 55 and an opposite end pivotally attached to the frame of the vehicle V". The rear link 56 is curved to accommodate the rear wheel of the vehicle V" and could of any suitable shape. When the door 50 is swung on the hinge 52, the links 53, 54, 56 and the member 55 remain in place.

Figure 10A:
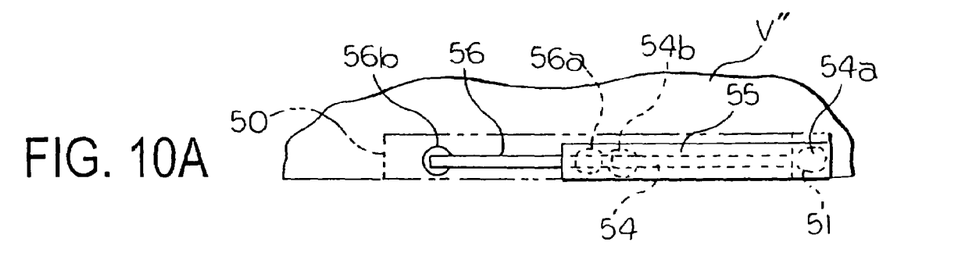
FIGS. 10a through 10d are schematic plan views of the door and movement mechanism shown in FIG. 9.
Figure 10B:
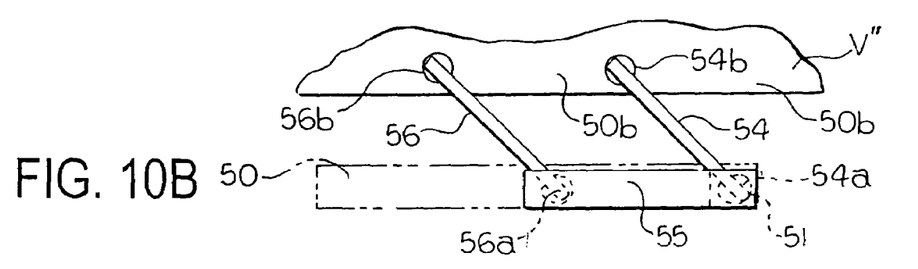
Figure 10C:
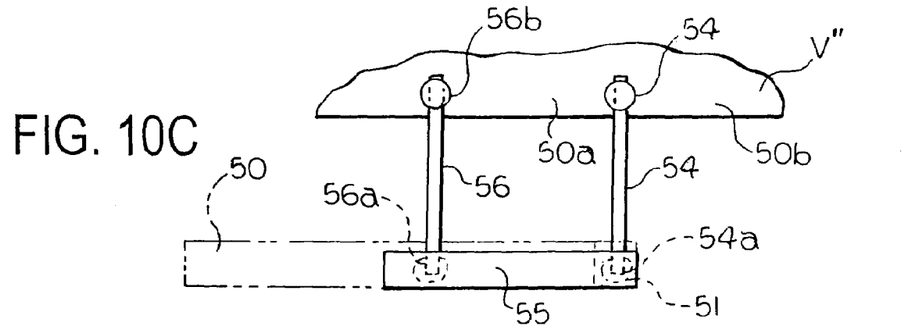
Figure 10D:
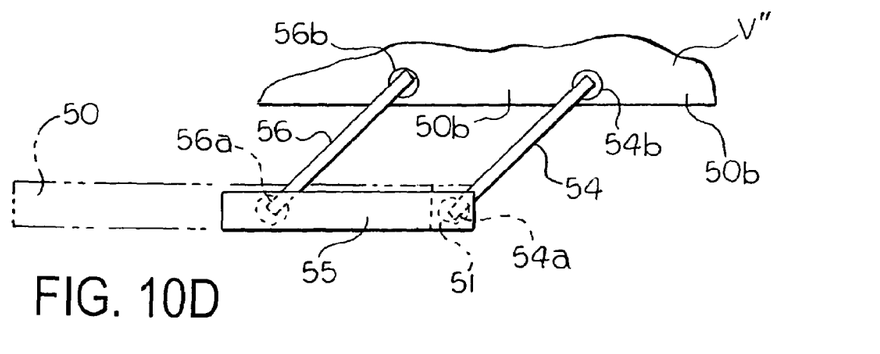

The links 53, 54 and 55 provide a second or "gliding" mode of operation for the door 50. As described above with respect to the center pillar 9, the center pillar 51 is releasably attached the frame of the vehicle V". When the pillar 51 is unlatched from the vehicle frame and the supporting member 55 is latched to the door 50, the door 50, the pillar 51 and the supporting member 55 are free to move as a unitary door assembly on the pivoting links 53, 54 and 56. In FIGS. 10a through 10d, for the purpose of clarity of illustration, the door 50 is shown in phantom line and the upper link 53 has been omitted. The door 50 is shown in the closed position in FIG. 10a. In FIG. 10b, the door 50, the pillar 51 and the supporting member 55 are pivoted outwardly partially exposing an access opening 50b that was covered by the door in FIG. 10a. In FIG. 10c, the door 50, the pillar 51 and the supporting member 55 are pivoted outwardly as far from the vehicle V" as the links 53 (not shown), 54 and 56 permit further exposing the access opening 50b. In FIG. 10d, the door 50, the pillar 51 and the supporting member 55 are pivoted rearwardly from the position shown in FIG. 10c further exposing the access opening 50b.

Figure 11:
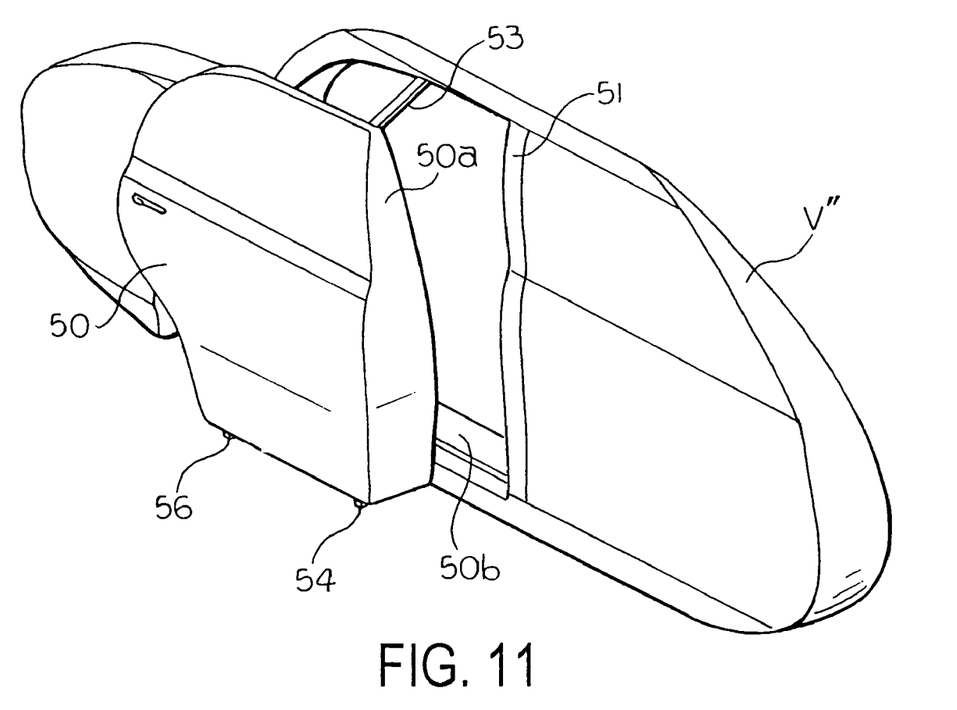
FIG. 11 is a perspective view a vehicle door and movement mechanism according to a further embodiment of the present invention.

In a modification of the door 50 and movement mechanism shown in FIG. 9, the hinges 52 can be omitted so that the door does not swing open in the normal manner. Instead, the door 50, the pillar 51 and the supporting member 55 move only as a unit on the pivoting links 53, 54 and 56 in the "gliding" mode of operation. Either the supporting member 55 is fixedly attached to the door 50 or it can be eliminated. In a further modification, shown in FIG. 11, the "B" pillar 51 can be fixed to the vehicle and the hinges 52 eliminated. The door 50 then moves on the pivoting links 53, 54 and 56 in the "gliding" mode of operation only.

Figure 12:
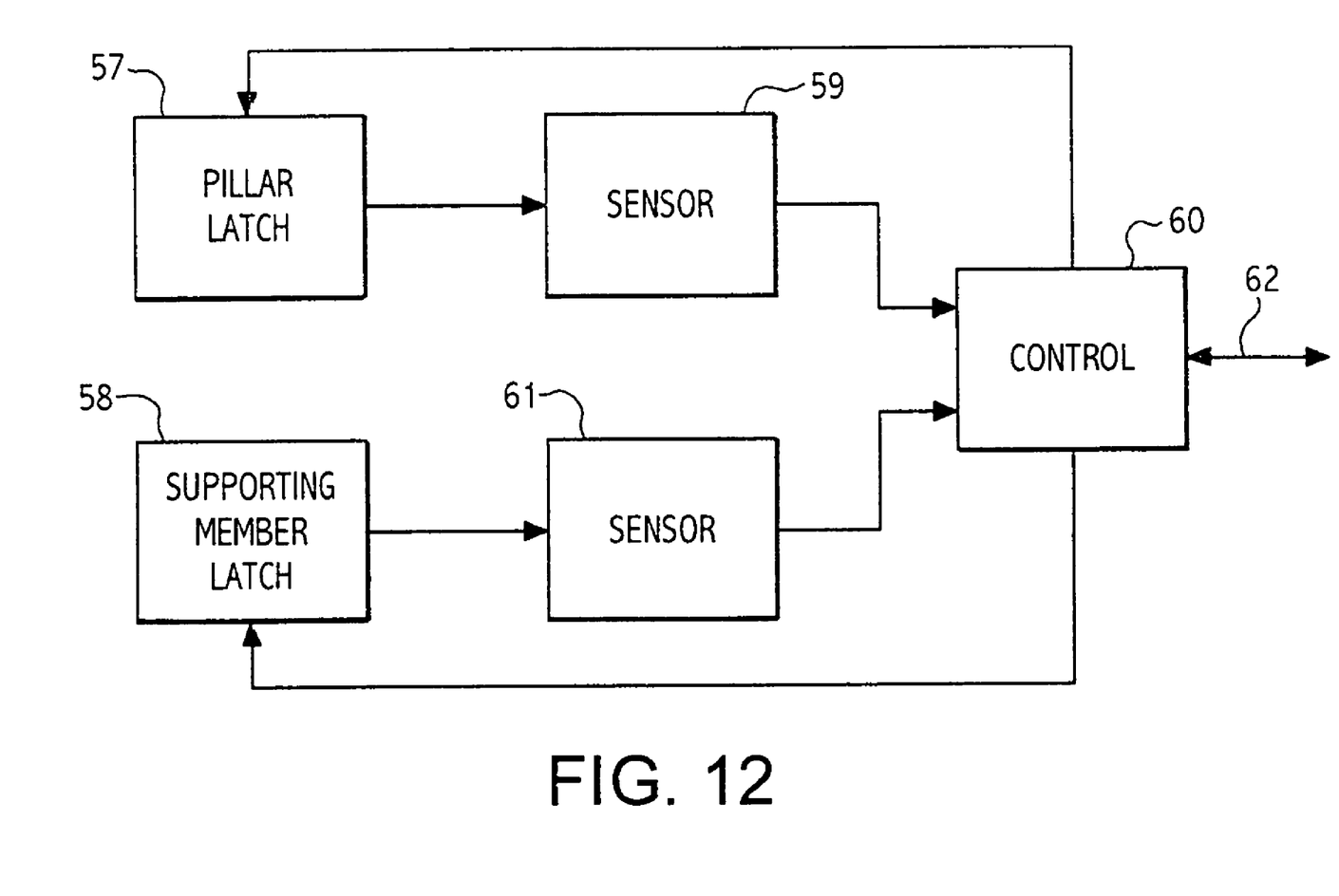
FIG. 12 is a block diagram schematic view of a sensing system for use with the movement mechanism according to the present invention.

There is shown in FIG. 12 a control system for ensuring that the latching and unlatching of the pillar 51 and the supporting member 55 are coordinated with the desired mode of operation. A pillar latch 57 is provided for the pillar 51 and a supporting member latch 58 is provided for the member 55. A first sensor 59 has an input connected to the pillar latch 57 to generate a signal representing the state of the pillar latch 57.at an output connected to an input of a control 60. A second sensor 61 has an input connected to the member latch 58 to generate a signal representing the state of the member latch 58 at an output connected to an input of the control 60. The control 60 has a first output connected to the pillar latch 57 which can be used to signal an electric actuator to latch and unlatch the pillar latch. The control 60 also has a second output connected to the member latch 58 which can be used to signal an electric actuator to latch and unlatch the member latch. Furthermore, the control 60 is connected by one or more lines 62 to components of the vehicle such as a sensor (not shown) that provides an indication that the vehicle automatic transmission is in "park" before the control will unlatch the latches 57 and 58.

In summary, the embodiments shown in FIGS. 9 through 12 provide a mechanism for moving a door assembly which can be the door 50 and the center pillar 51 as a unit, or just the door to expose an access opening 50b defined by a door frame. The mechanism includes a first link 53 pivotally connected at opposite ends to a top edge of the door assembly and the frame, a second link 54 pivotally connected at opposite ends to a bottom edge of the door assembly and the frame, and a third link 56 pivotally connected at opposite ends to a bottom edge of the door assembly and the frame. The three links permit the door assembly to move outwardly and laterally relative to a vehicle frame.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A door system comprising:
   a door frame defining an access opening;
   a door assembly including a door covering said access opening and having a top edge, a bottom edge and a pair of opposed side edges extending between said top edge and said bottom edge;
   a first link having one end pivotally attached at said door assembly top edge adjacent a first one of said door assembly side edges and having an opposite end pivotally attached to said door frame adjacent said door assembly top edge;
   a second link having one end pivotally attached at said door assembly bottom edge adjacent said first one of said door assembly side edges and having an opposite end pivotally attached to said door frame adjacent said door assembly bottom edge; and
   a third link having one end pivotally attached at said door assembly bottom edge and having an opposite end pivotally attached to said door frame whereby said first, second and third links define a path of movement of said door assembly relative to said door frame between a closed position covering said access opening and an open position exposing said access opening, said path of movement being outwardly from said door frame and past a side edge of said access operating, whereby in the closed position said first, second and third links extend generally parallel to a plane of said door.

2. The door system according to claim 1 wherein said door assembly includes a center pillar releasably attached to said door frame at said first one of said door assembly side edges, said first link one end is pivotally secured to a top end of said center pillar and said second link one end is pivotally secured to a bottom end of said center pillar.

3. The door system according to claim 2 wherein said door assembly includes at least one hinge connecting said center pillar to said door whereby said door swings on said hinge between said closed position covering said access opening and another open position partially exposing said access opening.

4. The door system according to claim 2 wherein said door assembly include a pillar latch releasably securing said center pillar to said door frame.

5. The door system according to claim 2 wherein said door frame is a portion of a vehicle, said door is a rear door on a side of the vehicle and said center pillar separates said access opening from an access opening and associated front door on the side of the vehicle.

6. The door system according to claim 1 wherein said door assembly includes a supporting member extending along said door assembly bottom edge, said second link one end is pivotally secured to said supporting member and said third link one end is pivotally secured to said supporting member.

7. The door system according to claim 6 wherein said door assembly includes a supporting member latch releasably securing said supporting member to said door.

8. A door system for a vehicle comprising:
   a vehicle door frame defining a front access opening and an adjacent rear access opening;
   a center pillar attached to said door frame between said front access opening and said rear access opening;
   a door assembly covering said rear access opening and having a top edge, a bottom edge and a pair of opposed side edges extending between said top edge and said bottom edge;
   a first link having one end pivotally attached at said door assembly top edge adjacent a first one of said door assembly side edges and having an opposite end pivotally attached to said door frame adjacent said door assembly top edge;
   a second link having one end pivotally attached at said door assembly bottom edge adjacent said first one of said door assembly side edges and having an opposite end pivotally attached to said door frame adjacent said door assembly bottom edge; and
   a third link having one end pivotally attached at said door assembly bottom edge and having an opposite end pivotally attached to said door frame whereby said first, second and third links define a path of movement of said door assembly relative to said door fame between a closed position covering said rear access opening and an open position exposing said rear access opening, said path of movement being outwardly from said door frame and past a side edge of said rear access opening whereby in the closed position said first, second and third links extend generally parallel to a plane of said door assembly.

9. The door system according to claim 8 wherein said center pillar is releasably attached to said door frame, said door assembly includes a door attached to said center pillar, said first fink one end is pivotally secured to a top end of said center pillar and said second link one end is pivotally secured to a bottom end of said center pillar.

10. The door system according to claim 9 wherein said door assembly includes at least one hinge connecting said center pillar to said door whereby said door swings on said hinge between said closed position covering said rear access opening and another open position partially exposing said rear access opening.

11. The door system according to claim 9 wherein said door assembly includes a pillar latch releasably securing said center pillar to said door frame.

12. The door system according to claim 8 wherein said door assembly includes a supporting member extending along said door assembly bottom edge, said second link one end is pivotally secured to said supporting member and said third link one end is pivotally secured to said supporting member.

13. The door system according to claim 12 wherein said door assembly includes a door and a supporting member latch releasably securing said supporting member to said door.

14. The door system according to claim 1 wherein said first link is the only attachment between said door assembly top edge and said door frame.

15. The door system according to claim 8 wherein said first link is the only attachment between said door assembly top edge and said door frame.

16. A door system comprising:
a door frame defining an access opening;
a door assembly including a door covering said access opening and having a top edge, a bottom edge and a pair of opposed side edges extending between said top edge and said bottom edge;
a first link having one end pivotally attached at said door assembly top edge and having an opposite end pivotally attached to said door frame adjacent said door assembly top edge, said first link being the only attachment between said door assembly top edge and said door frame;
a second link having one end pivotally attached at said door assembly bottom edge adjacent said fire one of said door assembly side edges and having an opposite end pivotally attached to said door firame adjacent said door assembly bottom edge; and
a third link having one end pivotally attached at said door assembly bottom edge and having an opposite end pivotally attached to said door frame whereby said first, second and third links define a path of movement of said door assembly relative to said door frame between a closed position covering said access opening and an open position exposing said access opening, said path of movement being outwardly from said door frame and past a side edge of said access opening.

17. The door system according to claim 16 wherein said third link opposite and extends upwardly away from said door assembly bottom edge to a door frame attachment point spaced horizontally and vertically from said door assembly bottom edge.

18. The door system according to claim 16 wherein said third link is curved along at least a portion of a length thereof.

* * * * *